US009221429B2

(12) United States Patent
Avasiloaie et al.

(10) Patent No.: US 9,221,429 B2
(45) Date of Patent: Dec. 29, 2015

(54) WIPER COUPLER ASSEMBLY AND WIPER ASSEMBLY INCORPORATING SAME

(71) Applicant: TRICO PRODUCTS CORPORATION, Rochester Hills, MI (US)

(72) Inventors: Valentin Avasiloaie, Dearborn Heights, MI (US); Daniel Ehde, Ortonville, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 231 days.

(21) Appl. No.: 13/677,423

(22) Filed: Nov. 15, 2012

(65) Prior Publication Data

US 2014/0130282 A1    May 15, 2014

(51) Int. Cl.
*B60S 1/40* (2006.01)
*B60S 1/38* (2006.01)

(52) U.S. Cl.
CPC ............... *B60S 1/387* (2013.01); *B60S 1/3851* (2013.01); *B60S 1/4003* (2013.01); *B60S 1/3858* (2013.01); *B60S 1/4006* (2013.01); *B60S 1/4038* (2013.01); *B60S 1/4048* (2013.01); *B60S 1/4067* (2013.01)

(58) Field of Classification Search
CPC .... B60S 1/3848; B60S 1/3849; B60S 1/3851; B60S 1/387; B60S 1/4003; B60S 1/4077; B60S 1/3858; B60S 1/4048; B60S 1/4067; B60S 1/4006; B60S 1/4038
USPC .......................................... 15/250.32, 250.43
See application file for complete search history.

(56) References Cited

U.S. PATENT DOCUMENTS

| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |

(Continued)

FOREIGN PATENT DOCUMENTS

| DE | 1028896 B | 4/1958 |
| DE | 1247161 B | 8/1967 |

(Continued)

OTHER PUBLICATIONS

Feb. 10, 2014 International Search Report for PCT/US2013/069387.

(Continued)

*Primary Examiner* — Gary Graham
(74) *Attorney, Agent, or Firm* — Howard & Howard Attorneys PLLC

(57) ABSTRACT

The present invention relates to a wiper assembly and a coupler assembly for use in releasably attaching the wiper assembly to a plurality of different attachment member for wiper arms. The coupler assembly includes a base mounted to structure of the wiper assembly and at least one coupler releasably attached to the base to allow connection to the attachment members. The coupler assembly also includes a release lever cooperating with the base and the at least one coupler for releasing the at least one coupler from the base to facilitate releasable attachment between a wiper assembly and the attachment members of the wiper arms.

9 Claims, 6 Drawing Sheets

(56) References Cited

U.S. PATENT DOCUMENTS

| | | |
|---|---|---|
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B2 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,287,296 B2 | 10/2007 | Vacher |
| 7,451,520 B2 | 11/2008 | Weiler et al. |
| 7,523,522 B2 | 4/2009 | Herring et al. |
| 7,546,660 B2 | 6/2009 | Heinrich et al. |
| 7,581,279 B2 | 9/2009 | Baseotto et al. |

(56) References Cited

U.S. PATENT DOCUMENTS

| | | |
|---|---|---|
| 7,621,016 B2 | 11/2009 | Verelst et al. |
| 7,774,892 B2 | 8/2010 | Coughlin |
| 8,381,349 B2 * | 2/2013 | Ku .............................. 15/250.32 |
| 2002/0026681 A1 | 3/2002 | Nacamuli |
| 2003/0159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1 | 7/2004 | Lee |
| 2006/0130263 A1 | 6/2006 | Coughlin |
| 2007/0174989 A1 | 8/2007 | Moll et al. |
| 2008/0066254 A1 | 3/2008 | Vacher |
| 2009/0199357 A1 | 8/2009 | Thienard |
| 2011/0277265 A1 | 11/2011 | Ehde |
| 2012/0060316 A1 | 3/2012 | Avasiloaie et al. |

FOREIGN PATENT DOCUMENTS

| | | |
|---|---|---|
| DE | 1505397 A1 | 10/1969 |
| DE | 1655410 A1 | 8/1971 |
| DE | 2311293 A1 | 9/1974 |
| DE | 2336271 A1 | 2/1975 |
| DE | 2350302 A1 | 4/1975 |
| DE | 2353368 A1 | 5/1975 |
| DE | 2640399 A1 | 3/1977 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0594451 A1 | 4/1994 |
| FR | 1069875 A | 2/1954 |
| FR | 2377302 A1 | 8/1978 |
| FR | 2515121 A1 | 4/1983 |
| GB | 878951 A | 10/1961 |
| GB | 1012902 A | 12/1965 |
| GB | 1489791 | 4/1975 |
| GB | 1395918 A | 5/1975 |
| GB | 2308542 A | 7/1997 |
| JP | 2007-331748 A | 12/2007 |
| KR | 1020110034994 A | 4/2011 |
| WO | 0021809 A1 | 4/2000 |
| WO | 02087935 A1 | 11/2002 |
| WO | 03051696 A1 | 6/2003 |
| WO | 03080409 A1 | 10/2003 |
| WO | 2004048163 A1 | 6/2004 |
| WO | 2004076251 A1 | 9/2004 |
| WO | 2004076252 A1 | 9/2004 |
| WO | 2006069648 A1 | 7/2006 |
| WO | 2009133979 A1 | 11/2009 |
| WO | 2011131395 A2 | 10/2011 |

OTHER PUBLICATIONS

Feb. 10, 2014 Written Opinion for PCT/US2013/069387.

* cited by examiner

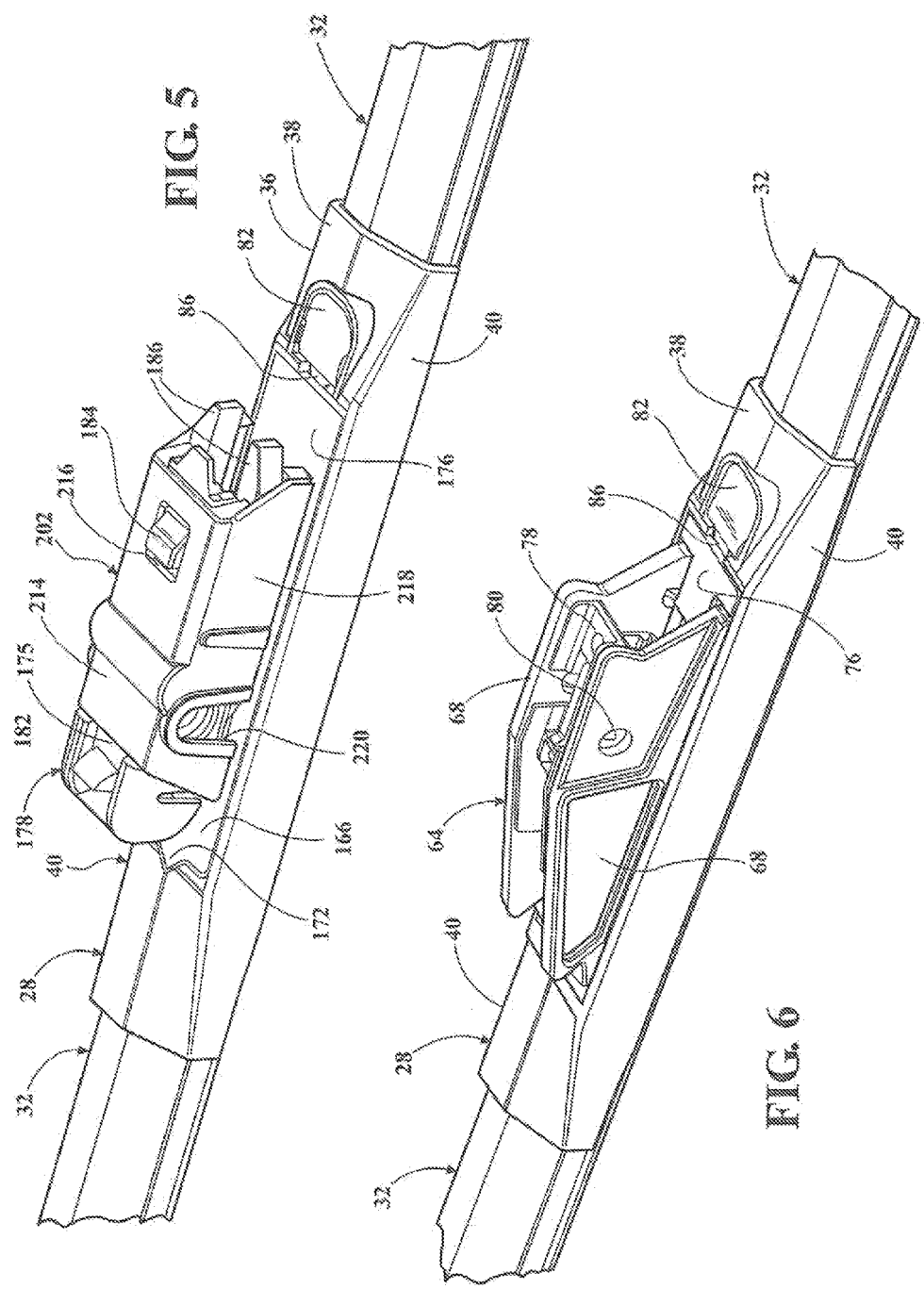

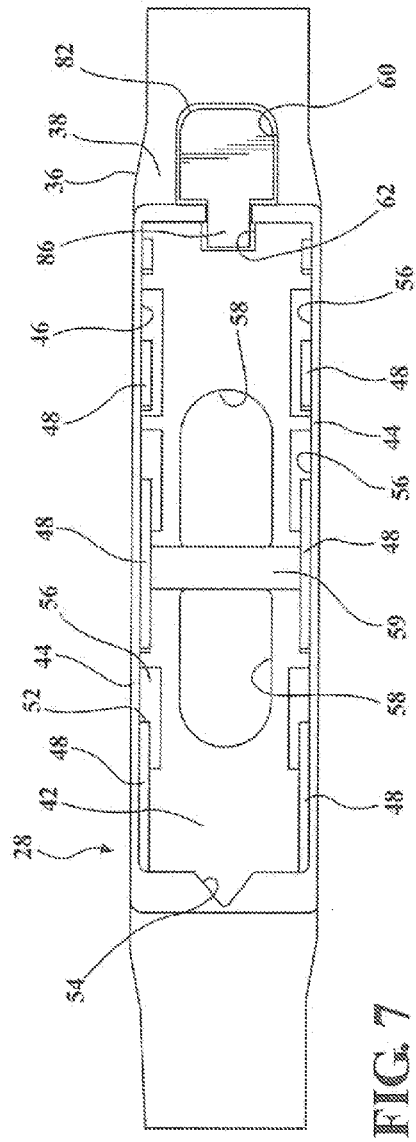

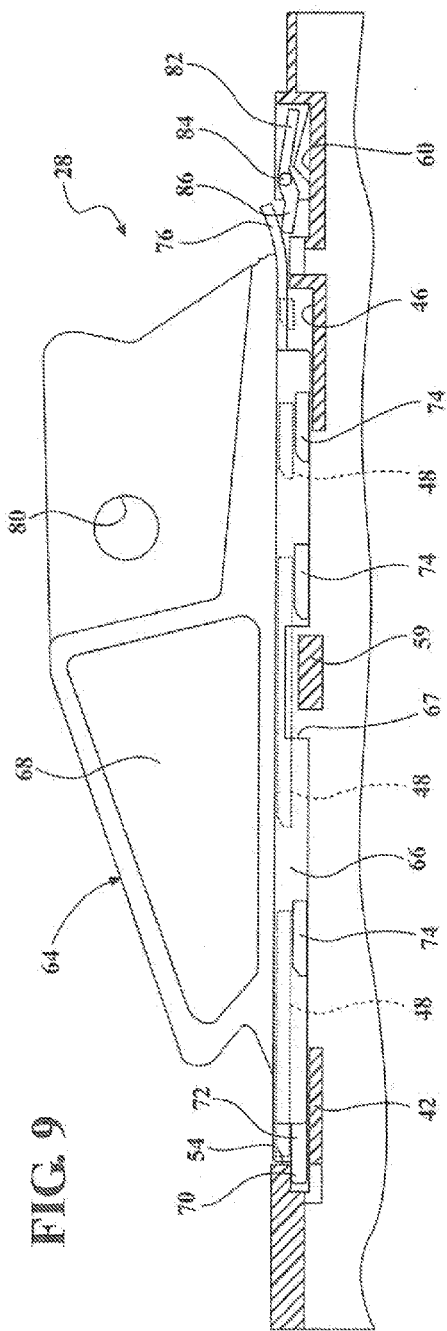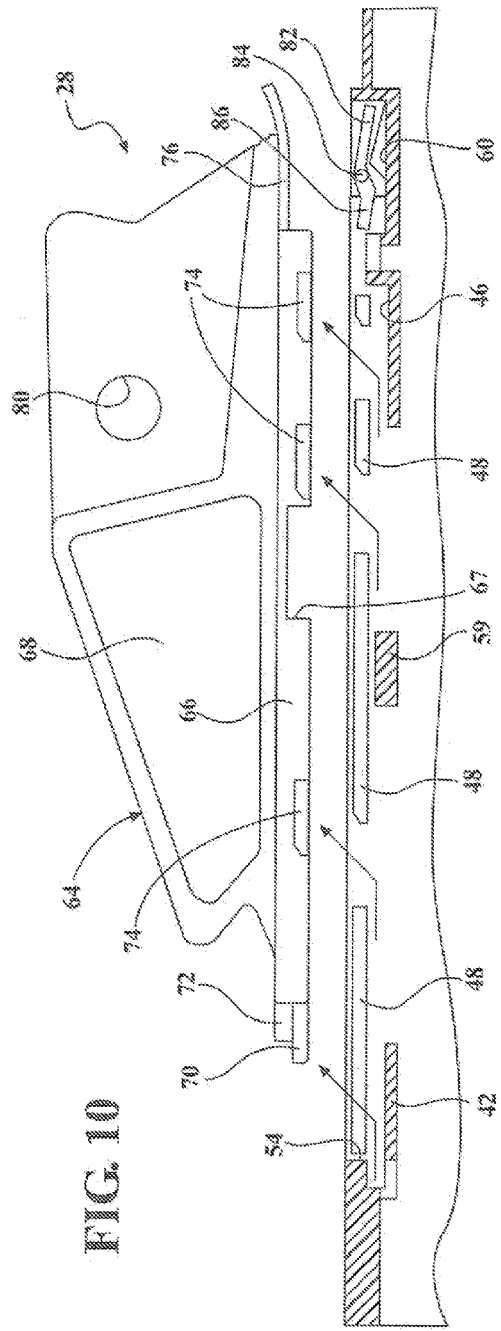

WIPER COUPLER ASSEMBLY AND WIPER ASSEMBLY INCORPORATING SAME

BACKGROUND OF THE INVENTION

1. Field of the Invention

The present invention relates generally to wiper assemblies for vehicles and, more specifically, to a wiper coupler assembly and wiper assembly incorporating same for use in connecting the wiper assembly to a wiper arm of a vehicle.

2. Description of the Related Art

Conventional wiper assemblies known in the related art include some type of wiper assembly mounted to a wiper arm which, in turn, is mounted adjacent a surface to be cleaned such as a windshield and pivotally driven to impart reciprocating motion to the wiper assembly across the windshield. The wiper assembly typically includes a rubber wiping element that contacts the windshield across the surface to be wiped. Generally, the wiper assembly may be classified into one of two categories commonly referred to as "tournament-style" wiper assemblies and "beam-blade style" wiper assemblies.

The wiper assembly also typically includes a coupler that acts to interconnect the wiper arm and the wiping element. The coupler typically includes structure that operatively engages an attachment member for connection with the wiper arm. By way of example, certain wiper arms employed by OEM's include "bayonet-style"; "pin-type"; or "hook-type" attachment members of various sizes that operatively engage the wiper assemblies. The coupler operativety engages at least one of these different attachment members for use in connection with the wiper assemblies.

While such wiper assemblies are limited for use with a particular style of wiper arm, the coupler of the wiper assembly is usually designed solely for use with a single type of wiper arm style. As a result, it is desirable to provide a coupling for different types of wiper arm styles. Further, there is a need in the art for a coupler that operatively attaches a wiper assembly to different attachment members of wiper arms. In addition, there is a need in the art for a coupler that operatively engages a wiper arm designed for a particular wiper assembly.

SUMMARY OF THE INVENTION

The present invention overcomes many limitations and disadvantages in the related art in a wiper assembly and a coupler assembly for use in releasably attaching the wiper assembly to a plurality of different attachment members for wiper arms. The coupler assembly includes a base mounted to structure of the wiper assembly and at least one coupler releasably attached to the base to allow connection to the attachment members. The coupler assembly also includes a release lever cooperating with the base and the at least one coupler for releasing the at least one coupler from the base to facilitate releasable attachment between a wiper assembly and the attachment members of the wiper arms.

Further, the present invention is a coupler assembly for use in releasably attaching a wiper assembly to a plurality of different attachment members for wiper arms. The coupler assembly includes a base mounted to structure of the wiper assembly. The base has a primary cavity, a plurality of tabs extending into the primary cavity, a plurality of openings between the tabs, a recess extending longitudinally from one end of the primary cavity, and a secondary cavity spaced longitudinally from the primary cavity. The coupler assembly also includes at least one coupler releasably attached to the base to allow connection to the attachment members. The at least one coupler has a base wall, a plurality of projections extending laterally from both longitudinal sides of the base wall to be disposed through the openings and under the tabs of the base, a projection extending outwardly from one end of the base wall to be received in the recess of the base, and a tab extending longitudinally from another end of the base wall to be disposed in the primary cavity of the base. The coupler assembly further includes a release lever disposed in the secondary cavity of the base and cooperating with the tab of the at least one coupler for releasing the at least one coupler from the base to facilitate releasable attachment between a wiper assembly and the attachment members of the wiper arms.

In addition, the present invention is a wiper assembly for use in connection with a plurality of wiper arms. The wiper assembly includes a wiping element adapted to contact a surface to be wiped, a structure to support the wiping element, and a coupler assembly that releasably attaches the structure to a plurality of different attachment members of the wiper arms. The coupler assembly including a base mounted to the structure and at least one coupler releasably attached to the base to allow connection to the attachment members.

Thus, one advantage of the present invention is that a new coupler assembly is provided that operatively attaches a wiper assembly to a wiper arm. Another advantage of the present invention is that the coupler assembly provides a wiper assembly with easy to change coupling adaptors. Yet another advantage of the present invention is that the coupler assembly is used on a wiper assembly for aesthetic and ease of installation and removal. Still another advantage of the present invention is that the coupler assembly provides a wiper system with a replaceable wiper assembly to reduce the costs associated with replacing a wiper assembly. A further advantage of the present invention is that the coupler assembly provides a wiper assembly incorporating a replaceable wiping element to be replaced by readily available wiping elements to simplify the task associated with replacing a wiper assembly. Yet a further advantage of the present invention is that a wiper assembly is provided with easy to align and change adaptors for different arm types. Still a further advantage of the present invention is that the wiper assembly has a coupler assembly with self-aligning and easy to slide locking mechanisms, while at the same time having easy release adaptors.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 5 is a perspective view of one of the adaptors and couplers assembled to the base in accordance with the embodiment illustrated in FIG. 4.

FIG. 6 is a perspective view of the other one of the adaptors and couplers assembled to the base in accordance with the embodiment illustrated in FIG. 4.

FIG. 7 is a plan view of the base of the coupler assembly in accordance with the embodiment illustrated in FIG. 4.

FIG. 8 is a fragmentary elevational view of one of the couplers and the base of the coupler assembly in accordance with the embodiment illustrated in FIG. 4 in a first position.

FIG. 9 is a fragmentary elevational view of one of the couplers and the base of the coupler assembly in accordance with the embodiment illustrated in FIG. 4 in a second position.

FIG. 10 is a fragmentary elevational view of one of the couplers and the base of the coupler assembly in accordance with the embodiment illustrated in FIG. 4 in a third position.

DETAILED DESCRIPTION OF THE PREFERRED EMBODIMENT(S)

Figure 1:
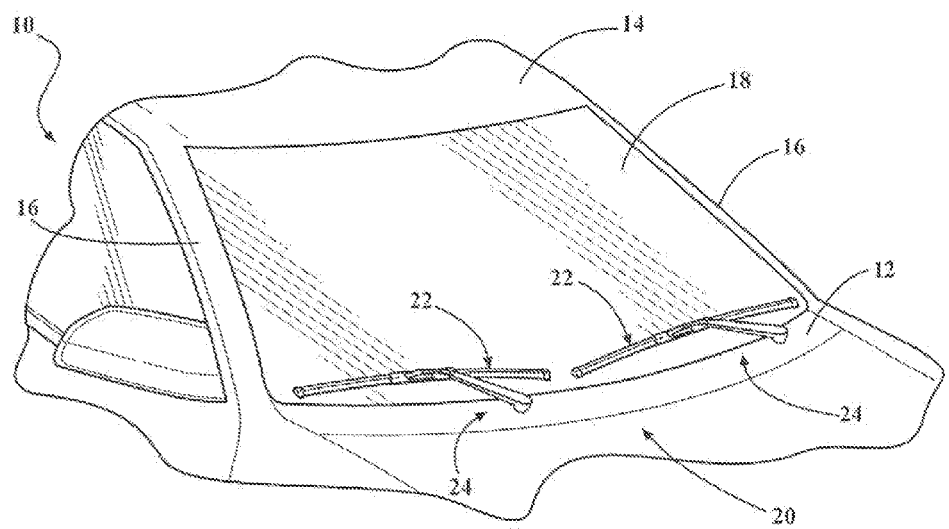
FIG. 1 is a partial perspective view of a front of a vehicle having a pair of wiper assemblies pivotally mounted for reciprocal movement across a windshield of the vehicle.

Referring now to the figures, where like numerals are used to designate like structure, a portion of a vehicle is illustrated at 10 in FIG. 1. The portion of the vehicle 10 includes a body having a cowl 12, a roof 14, and a pair of laterally spaced front or "A"-pillars 16 extending between the roof 14 and the cowl 12. The A-pillars 16, roof 14, and cowl 12 cooperate to define a generally rectangular perimeter, which supports a curved or "swept back" windshield 18.

A wiper system is generally indicated at 20 in FIG. 1 and is employed to clean the windshield 18. In the representative example illustrated herein, the wiper system 20 includes a pair of wiper assemblies, generally indicated at 22, and which correspond to the driver and passenger side of the vehicle 10. However, those having ordinary skill in the art will appreciate that the wiper system 20 could employ a single wiper assembly 22 without departing from the scope of the present invention. Each wiper assembly 22 (hereinafter "wiper assembly") is carried by a corresponding wiper arm assembly, generally indicated at 24. The wiper arm assembly 24 includes an attachment member 25 (partly shown) adapted to operatively engage the wiper assembly 22. The wiper system 20 also includes an electrical motor (not shown but generally known in the art) typically employed to power the wiper system 20 to move the wiper assemblies 22 in an oscillating manner across the surface of the windshield 18.

While the wiper assembly 22 illustrated in FIG. 1 is shown in connection with the front windshield 18 of the vehicle 10, those having ordinary skill in the art will appreciate that the wiper assemblies 22 may be employed in other areas of the vehicle 10, such as a rear window (not shown) or a head lamp (not shown) that employs a wiper system. Thus, it will be understood that the present invention is not limited for use solely in connection with wiper arm assemblies 24 and wiper assemblies 22 adapted for use on a vehicle's windshield 18, but for use in all applications where wiper arm assemblies 24 and wiper assemblies 22 are employed.

Figure 2:
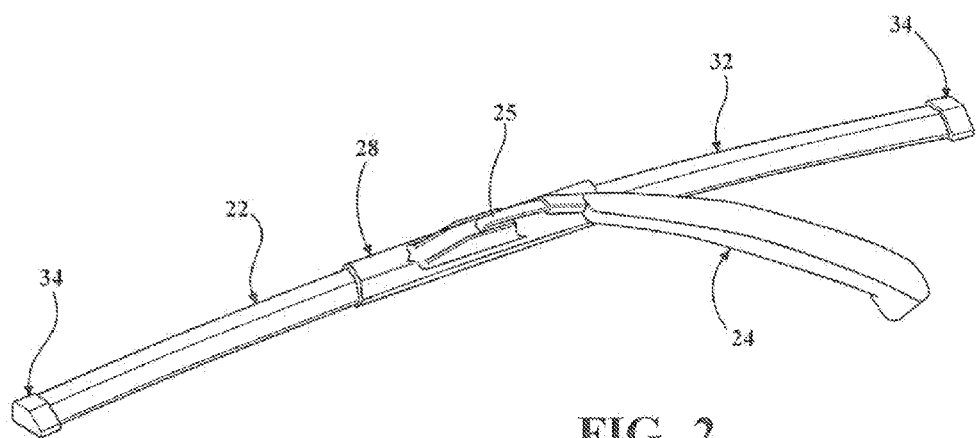
FIG. 2 is an enlarged perspective view of the wiper assembly of FIG. 1.
Figure 3:
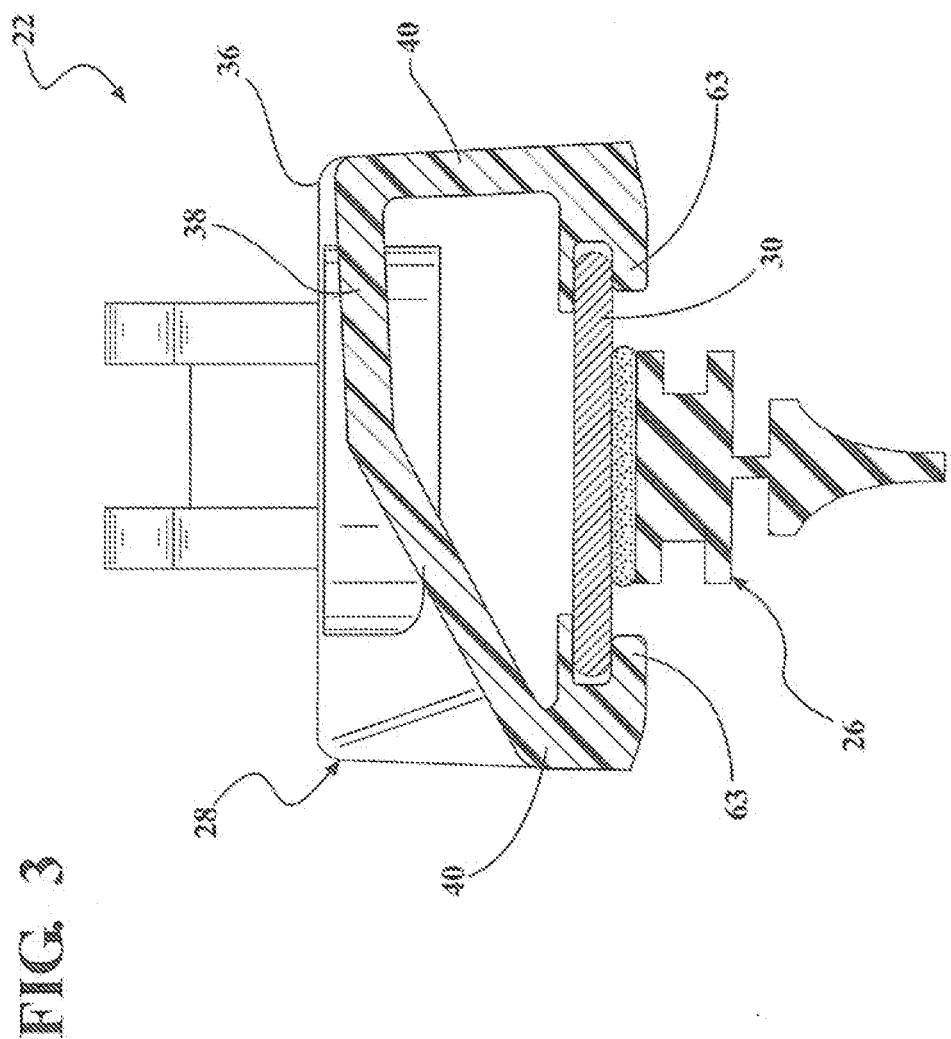
FIG. 3 is a sectional view of the wiper assembly of FIG. 1.

Referring to FIGS. 2 and 3, the wiper assembly 22 includes a wiping element, generally indicated at 26, that is adapted to contact the surface of the vehicle 10 to be wiped, in this representative example, the windshield 18. In addition, the wiper assembly 22 generally includes a coupler assembly, according to the present invention and generally indicated at 28, that acts to interconnect the wiper arm assembly 24 and the wiping element 26. The wiper assembly 22 also includes at least one elongated beam 30 that defines a longitudinal axis and that acts as a structure to support the wiping element 26. The wiping element 26 is attached to a surface of the beam 30 by a suitable mechanism such as an adhesive. The wiper assembly 22 may also include an airfoil assembly, generally indicated at 32, and a pair of end caps, generally indicated at 34. It should be appreciated that the coupler assembly 28 is adapted to connect the wiper assembly 22 to the wiper arm assembly 24. It should also be appreciated that the coupler assembly 28 operatively engages at least one particular type of attachment member 25, but may operatively engage multiple types of attachment members 25. By way of example, different OEM's employ wiper arm assemblies 24 having different attachment members 25 adapted to operatively engage a specific type of wiper assembly 22. Accordingly, the coupler assembly 28 operatively engages at least one or more of these different attachment members 25. Further by way of example, certain wiper arm assemblies 24 employed by OEM's include "bayonet-style"; "pin-type"; or "hook-type" attachment members 25 of various sizes that operatively engage the wiper assemblies 22. Accordingly, the coupler assembly 28 illustrated herein may include one or more adaptors to be described for operatively engaging at least one or more of these different attachment members 25 for use in connection with the wiper assemblies 22 without departing from the scope of the present invention.

Referring to FIGS. 4 through 10, one embodiment of the coupler assembly 28, in accordance with the present invention, is shown. The coupler assembly 28 is adapted to releasably connect the wiper assembly 22 to the attachment member 25 of the wiper arm assembly 24. More specifically, the coupler assembly 28 includes a base 36 that engages or is connected to the beam 30. The base 36 has an exterior top wall 38 and a plurality of exterior side walls 40 extending from the top wall 38. The base 38 also has an interior bottom wall 42 and a plurality of interior side walls 44 forming a primary cavity 46 extending longitudinally therein. The primary cavity 46 is generally rectangular in shape. The base 36 also has a plurality of tabs 48 extending laterally from the interior side walls 44 into the primary cavity 46. The tabs 48 are generally rectangular in shape and spaced longitudinally. Each of the tabs 48 have a slot 50 extending longitudinally therein and an opening 52 extending perpendicular thereto. The base 36 also has a recess 54 extending inwardly into the top wall 38 at a forward end thereof. The recess 54 has a generally "V" shape, but may be any suitable shape, for a function to be described. The base 36 also has at least one, preferably a plurality of vent apertures 56 extending through the interior bottom wall 42 adjacent the side walls 44 to allow water to pass therethrough. The base 36 also has a plurality of vent apertures 58 extending through the interior bottom wall 42 near a central portion thereof to allow water to pass therethrough and a raised bar 59 disposed therebetween and extending laterally. The base 36 also has a secondary cavity 60 spaced from a rearward end of the primary cavity 46. The secondary cavity 60 is generally rectangular in shape. The secondary cavity 60 has a recess 62 extending laterally near a forward end thereof. The base 36 has a plurality of tabs 63 spaced longitudinally and extending laterally inward from the side walls 40 to overlap the beam 30. The tabs 63 are generally rectangular in shape. The base 36 is integral, unitary, and made as one-piece. The base 36 is made of a rigid material such as plastic.

The coupler assembly 28 also includes a coupler, generally indicated at 64, to cooperate with the base 36. The coupler 64 includes a base wall 66 having a recess 67 extending laterally thereacross. The base wall 66 is generally rectangular in shape. The coupler 64 also includes side walls 68 extending upwardly from the base wall 66. The coupler 64 also includes a flange 70 extending outwardly from a forward end of the base wall 66. The flange 70 is generally rectangular in shape. The coupler 64 also includes a projection 72 extending outwardly and overlapping the flange 70. The projection 72 is generally "V" shaped and extends longitudinally. The coupler 64 includes a plurality of projections 74 extending laterally from both longitudinal sides of the base wall 66. The projections 74 are generally rectangular in shape and spaced longitudinally. The coupler 64 includes a tab 76 extending longitudinally from a rear end thereof. In one embodiment, the tab 76 is generally "T" shaped and extends longitudinally from the base wall 66. The coupler 64 also includes an adaptor 78 pivotally attached between the side walls 68 for attachment to one type of attachment member 25 of the wiper arm assembly 24 as is known in the art. The coupler 64 also includes an aperture 80 extending through the side walls 68 for attachment to another type of attachment member 25 of the wiper arm assembly 24 as is known in the art. The coupler 64 is integral, unitary, and made as one-piece. The coupler 64 is made of a rigid material such as plastic.

The coupler assembly 28 further includes a quick release lever 82 for releasing the coupler 64 from the base 36. The release lever 82 is generally rectangular in shape. The release lever 82 has a pair of laterally spaced recess near a forward end thereof to form a shaft member 84. The release lever 82 also includes a tab 86 extending longitudinally from a forward end thereof. The tab 86 is generally rectangular in shape. The release lever 82 is integral, unitary, and made as one-piece. The release lever 82 is made of a rigid material such as plastic.

Figure 4:
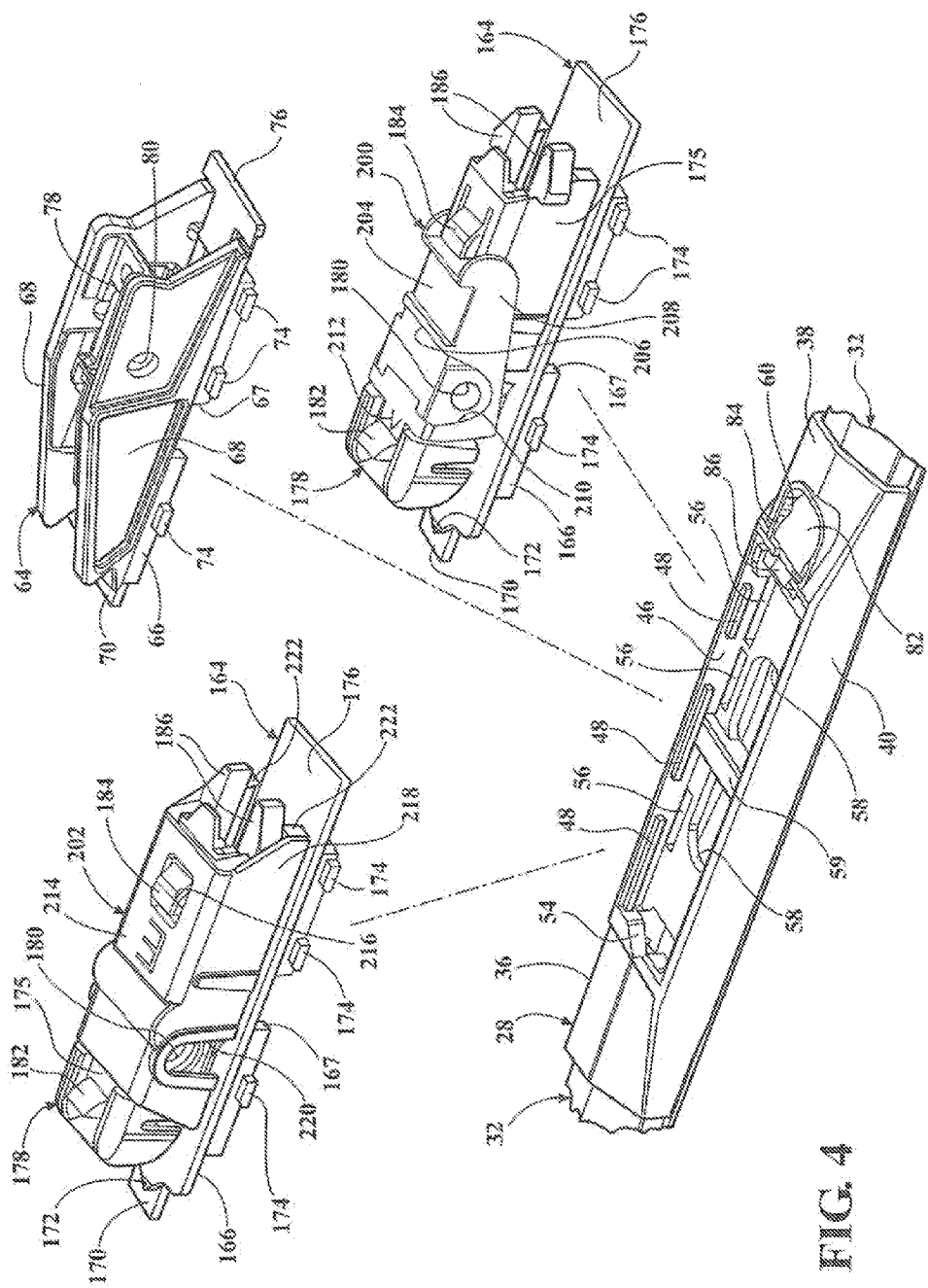
FIG. 4 is an exploded perspective view of two different adaptors, two different supplemental adaptors, two different couplers, and base in accordance with one embodiment of a coupler assembly, according to the present invention for the wiper assembly of FIG. 1.

Referring to FIGS. 4 and 5, another embodiment, according to the present invention, of the coupler 64 is shown. Like parts of the coupler 64 have like reference numerals increased by one hundred (100). In this embodiment, the coupler 164 includes a base wall 166 having a recess 167 extending laterally thereacross. The base wall 166 is generally rectangular in shape. The coupler 164 also includes a flange 170 extending outwardly from a forward end of the base wall 166. The flange 170 is generally rectangular in shape. The coupler 164 also includes a projection 172 extending outwardly and overlapping the flange 170. The projection 172 is generally "V" shaped and extends longitudinally. The coupler 164 includes a plurality of projections 174 extending laterally from both longitudinal sides of the base wall 166. The projections 174 are generally rectangular in shape and spaced longitudinally. The coupler 162 also includes an elevated portion 175 extending upwardly and longitudinally from the base wall 166. The coupler 164 includes a tab 176 extending longitudinally from a rear end thereof. In one embodiment, the tab 176 is generally rectangular shaped and extends longitudinally from the base wall 166.

The coupler 164 also includes an adaptor 178 pivotally attached to the elevated portion 175 for attachment to one type of attachment member 25 of the wiper arm assembly 24 as is known in the art. The adaptor 178 also includes an aperture 180 extending therethrough for attachment to another type of attachment member 25 of the wiper arm assembly 24 as is known in the art. The adaptor 178 includes a cantilevered vertical locking member 182 near a forward end thereof. The adaptor 178 also includes a cantilevered horizontal locking member 184 near a rearward end thereof. The adaptor 178 further includes a pair of cantilevered locking tabs 186 spaced laterally from the sides at the rearward end thereof. The coupler 164 is integral, unitary, and made as one-piece. The coupler 164 is made of a rigid material such as plastic.

Accordingly, the coupler assembly 28 illustrated herein may include at least one, preferably a first supplemental adaptor, generally indicated at 200, and a second supplemental adaptor, generally indicated at 202, for operatively engaging at least one or more of these different attachment members 25 for use in connection with the wiper assemblies 22. The supplemental adaptors 200 and 202 are used in connection with the coupler 164. As illustrated in FIG. 4, the first supplemental adapter 200 includes a top wall 204 extending longitudinally. The top wall 204 is generally rectangular in shape. The top wall 204 has an aperture 206 extending therethrough. The aperture 206 is generally rectangular in shape. The first supplemental adapter 200 includes a pair of opposed side walls 208 extending generally perpendicularly from the top wall 204 to form a generally inverted "U" shape. One of the side walls 208 includes a slot 210 extending therethrough. The slot 210 is a generally "U" shape. The other one of the side walls 208 includes an aperture (not shown) extending therethrough opposite the slot 210. The aperture is generally circular in shape. The first supplemental adapter 200 has a tab 212 extending longitudinally from one end thereof to be operatively engaged by the vertical locking member 182 of the coupler 164. The tab 212 is generally rectangular in shape. The first supplemental adapter 200 includes projections (not shown) extending longitudinally from the top wall 204 to be operatively engaged by the coupler 164. The projections are generally rectangular in shape and spaced laterally. The first supplemental adapter 200 is integral, unitary, and made as one-piece. The first supplemental adapter 200 is made of a rigid material such as plastic.

As illustrated in FIGS. 4 and 5, the second supplemental adaptor 202 includes a top wall 214 extending longitudinally. The top wall 214 is generally rectangular in shape. The top wall 214 has an aperture 216 extending therethrough to receive the horizontal locking member 184 of the coupler 164. The aperture 216 is generally rectangular in shape. The second supplemental adapter 202 includes a pair of opposed side walls 218 extending generally perpendicularly from the top wall 214 to form a generally inverted "U" shape. The side walls 218 include a slot 220 extending therethrough near one end thereof. The slot 220 is a generally inverted "U" shape. The second supplemental adapter 202 has projections 222 extending laterally inward from both ends of the side walls 218 to cooperate with the locking tabs 186. The second supplemental adaptor 202 is integral, unitary, and made as one-piece. The second supplemental adaptor 202 is made of a rigid material such as plastic.

The operation of the coupler assembly 28 is illustrated in FIGS. 8 through 10 in relation to the coupler 64. To assemble the coupler 64 to the base 36, the projections 74 of the coupler 64 are aligned with the openings 52 of the base 36. The coupler 64 is manually moved toward the base 36 such that the projections 74 of the coupler 64 are disposed through the openings 52 and the raised bar 59 is received in the recess 67 of the coupler 64. The coupler 64 may be moved manually forward by an operator until the projections 74 of the coupler 64 are disposed under the tabs 48 and the projection 72 is disposed in the recess 54 and the tab 76 is disposed in the primary cavity 46, overlapping the tab 86 of the release lever 82 in a locking action. When this occurs, the coupler 64 is locked to the base 36 in a first or assembled position as illustrated in FIG. 8. It should be appreciated that in this first position, the flange 70 is disposed under the top wall 38 of the base 36, the projections 74 are disposed under the tabs 48, and the tab 76 overlaps the tab 86 of the release lever 82.

Removal of the coupler 64 from the base 36 is illustrated in FIGS. 9 and 10. The coupler 64 is illustrated in a second or quick release position in FIG. 9. In FIG. 9, the release lever 82 is actuated by manually pressing on it by an operator to rotate about the shaft 84 such that the tab 86 engages and lifts the tab 76 of the coupler 64. When this occurs, the coupler 64 may be moved manually rearward by an operator until the projections 74 are not disposed under the tabs 48 and are aligned with the openings 52. The coupler 64 may then be moved manually upward by an operator and out of the primary cavity 46 and the coupler 64 is a third or disassembled position as illustrated in FIG. 10. It should be appreciated that the coupler 164 operates similar to the coupler 64 in regard to assembling and disassembling the coupler 164 from the base 36.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper assembly for use in connection with a plurality of wiper arms, said wiper assembly comprising:
    a wiping element adapted to contact a surface to be wiped;
    a structure to support said wiping element; and
    a coupler assembly that releasably attaches said structure to a plurality of different attachment members of the wiper arms, said coupler assembly including a base mounted to said structure, said base having a primary cavity and a secondary cavity spaced longitudinally from said primary cavity, said coupler assembly further including at least one coupler releasably attached to said base to allow connection to the attachment members, wherein said at least one coupler includes a tab extending longitudinally from a rear end thereof to be disposed in said primary cavity of said base and wherein a release lever disposed in said secondary cavity of said base and cooperating with said tab of said at least one coupler for releasing said at least one coupler from said base.

2. A wiper assembly as set forth in claim 1 wherein said base includes a primary cavity to receive a portion of said at least one coupler.

3. A wiper assembly as set forth in claim 1 wherein said base includes a plurality of tabs extending into said primary cavity and having a plurality of openings between said tabs.

4. A wiper assembly as set forth in claim 3 wherein said at least one coupler includes a base wall and a plurality of projections extending laterally from both longitudinal sides of said base wall to be disposed through said openings and under said tabs of said base.

5. A wiper assembly as set forth in claim 1 wherein said base includes a recess extending longitudinally from one end of said primary cavity.

6. A wiper assembly as set forth in claim 5 wherein said at least one coupler includes a projection extending outwardly to be received in said recess of said base.

7. A wiper assembly as set forth in claim 1 including at least one adaptor attached to said at least one coupler for operatively engaging at least one of the attachment members.

8. A wiper assembly as set forth in claim 1 including a first supplemental adaptor releasably attached to said at least one coupler for operatively engaging at least one of the attachment members.

9. A wiper assembly as set forth in claim 1 wherein said base includes a plurality of vent apertures extending therethrough and communicating with said primary cavity to allow water to pass out of said primary cavity.

* * * * *